United States Patent
Awtrey et al.

(10) Patent No.: US 6,438,502 B1
(45) Date of Patent: Aug. 20, 2002

(54) ENVIRONMENTAL CONDITION SENSOR DEVICE AND METHOD

(75) Inventors: James D. Awtrey, Garland; Hal Kurkowski, Dallas; Robert D. Lee, Denton, all of TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

(21) Appl. No.: 09/703,456

(22) Filed: Oct. 31, 2000

Related U.S. Application Data

(63) Continuation-in-part of application No. 09/454,275, filed on Dec. 3, 1999, which is a continuation of application No. 09/178,675, filed on Oct. 26, 1998, now Pat. No. 6,018,228, which is a continuation of application No. 08/901,068, filed on Jul. 28, 1997, now Pat. No. 5,867,006, which is a continuation of application No. 08/764,285, filed on Dec. 12, 1996, now Pat. No. 5,694,024, which is a continuation of application No. 07/957,571, filed on Oct. 7, 1992, now Pat. No. 5,592,069.

(51) Int. Cl.[7] .................................................. G01K 5/24
(52) U.S. Cl. ....................... 702/130; 374/163
(58) Field of Search ........................ 702/130, 99, 133, 702/136; 236/1 B, 1 C, 91 R, 97 F, 94; 374/10, 100, 101, 109, 113, 132, 163, 166, 167; 320/144, 153, 154; 324/425, 426, 431, 224, 760, 670, 685, 721; 403/28; 337/800; 73/23.5, 766

(56) References Cited

U.S. PATENT DOCUMENTS

| | | | | |
|---|---|---|---|---|
| 3,791,217 A | * | 2/1974 | Stout et al. | .................... 73/342 |
| 4,463,436 A | * | 7/1984 | Veneklase | .................... 700/299 |
| 4,669,049 A | * | 5/1987 | Kosednar et al. | ........... 702/133 |
| 6,074,089 A | * | 6/2000 | Hollander et al. | .......... 374/181 |

* cited by examiner

Primary Examiner—Marc S. Hoff
Assistant Examiner—Edward Raymond
(74) Attorney, Agent, or Firm—Jenkens & Gilchrist

(57) ABSTRACT

A device and method for measuring temperature is disclosed. The device, for example, can include a thermocouple configured to generate a voltage indicative of a junction temperature; a memory device configured to store a unique device ID and to store data; a logic unit connected to the thermocouple and the memory device; an I/O interface connected to the logic unit, the I/O interface configured to communicate with a computer system; and an internal temperature sensor connected to the logic unit, the internal temperature sensor configured to determine a cold junction temperature.

13 Claims, 4 Drawing Sheets

ENVIRONMENTAL CONDITION SENSOR DEVICE AND METHOD

PRIORITY

This application is a continuation in part of application Ser. No. 09/454,275, filed on Dec. 3, 1999 entitled Battery Charger; which is a continuation of application Ser. No. 09/178,675, filed on Oct. 26, 1998, now U.S. Pat. No. 6,018,228 entitled Battery Charger; which is a continuation of application Ser. No. 08/901,068, filed on Jul. 28, 1997, now U.S. Pat. No. 5,867,006 entitled Battery Charger; which is a continuation of application Ser. No. 08/764,285, filed on Dec. 12, 1996, now U.S. Pat. No. 5,694,024, entitled Battery Charger, which is a continuation of application Ser. No. 07/957,571, filed on Oct. 7, 1992, now U.S. Pat. No. 5,592,069 entitled Battery Charger.

FIELD OF THE INVENTION

The present invention relates generally to sensor devices. More particularly, but not by way of limitation, the present invention relates to devices and methods for monitoring and communicating environmental conditions such as temperature, pressure, humidity, solar radiance, etc.

BACKGROUND OF THE INVENTION

The monitoring of environmental conditions has become critical in many applications. For example, the monitoring of temperature has become critical in food storage devices, perishable-item transportation systems, environmental controls, biological product management (e.g., blood shipments), mechanical failure warning devices (e.g., engine overheating detectors and wing icing detectors) and other similar devices. Additionally, other fields require that conditions such as humidity, pressure, and solar radiance be monitored.

With regard to the monitoring of temperature, for example, known systems utilize thermocouples and/or silicon based temperature measurement devices. A typical temperature system using a thermocouple is shown in FIG. 1.

One of the significant problems of any electronic environmental sensor such as temperature sensors is with the calibration of these types of devices (these types of issues are also present with other types of environmental sensors such as pressure, humidity and the like as well). Further different types of sensors are needed, just as in the temperature fields with different ranges of temperatures. The calibration and re-calibration of these types of system using different types of sensors or even the same types of sensors requires extensive time and effort either during the manufacturing process or during use.

If a direct to digital sensing system is to be deployed a user needs to know that the sensors and the system can be calibrated or is calibrated. An analog to digital conversion can be done by conventional techniques, but the calibration of the output to the real world and within the ranges of the sensor need to be made with respect to the real world ranges to be monitored.

Before describing an exemplary thermocouple system and its limitations, however, a brief background of known thermocouple technology is necessary. Thermocouples are temperature measurement devices that operate according to the Seebeck effect in which a unique self-generated voltage is produced at a given temperature when two dissimilar metals are joined together. In an effort to maximize performance, numerous combinations of metals have been examined to determine their output voltage versus temperature range. Two of the more popular metal combinations have been characterized under conventional industry terminology as Type K and Type E thermocouples. Although the full-scale output voltage of all thermocouples falls within the millivolt range, Type E thermocouples have the highest output with almost 80 mV at 1800° C.

To measure this relatively small output voltage, it is necessary to make connections to the wires forming the thermocouple. These connections form a second thermocouple (referred to as the cold junction) in series with the original thermocouple (referred to as the hot junction). To correct for any voltage output by the second thermocouple, the second thermocouple is often electronically corrected to zero degrees, i.e., the voltage is electronically corrected.

In the case of electronic correction, the temperature at the cold junction is measured, and the voltage that would be generated by the cold junction at that temperature is subtracted from the actual voltage reading. If the voltage versus temperature transfer function of the second thermocouple was highly linear, this subtraction would be all that was necessary to correct the reading. Unfortunately, the full-scale transfer function is usually fairly complex and requires several piece-wise approximations to maintain a specified accuracy.

Now referring to the typical thermocouple system 100 shown in FIG. 1, this version includes three thermocouples 102, 104, 106 for measuring temperature at three different locations. Each of these thermocouples 102, 104, 106 is connected by individual analog signal lines to specifically matched amplifiers 108, 110, 112 and each amplifier 108, 110, 112 is connected to a different input of a computer.

In operation, a thermocouple, such as thermocouple 102, generates a small voltage in response to a certain temperature. For a typical thermocouple, that voltage might be in the range of 1 mV at 25° C. Because this voltage is so small, it is fed into an amplifier 108 that is powered by voltage source Vs. The amplified voltage level is then communicated (through an analog transmission line) to the computer 114, which can translate the amplified voltage level into an actual temperature reading.

Although thermocouple systems like the one shown in FIG. 1 are somewhat effective, they are often prohibitively expensive and often lack the necessary resolution and accuracy for widespread use. As mentioned above, present thermocouple systems require a matched amplifier for each thermocouple. These amplifiers introduce added cost and added inaccuracies. Additionally, the analog output of the typical thermocouple, which is only in the millivolt range, is subject to interference by noise. To limit the impact of noise, the amplifier and the computer should generally be placed close to the thermocouple, thereby significantly limiting the placement of the thermocouple. Moreover, in certain embodiments, electromagnetic interference (EMI) shielding is required to limit the impact of noise. Of course, this shielding can introduce non-trivial additional costs.

Another problem with present thermocouple systems is their lack of expandability and adaptability. For example, the number of thermocouples that a system can use is generally limited to the number of input pins for the computer—although some embodiments use multiplexers, and other complicated systems, to expand the number of thermocouples that can be connected to a computer. Additionally, each thermocouple, which only transmits analog voltage signals, should be placed on its own line rather than placing multiple thermocouples on each line. Thus, wiring the system shown in FIG. 1 often requires duplicative wiring and the associated additional costs.

Accordingly, present thermocouple systems suffer from significant deficiencies that limit the use of an otherwise beneficial technology. Although some of these deficencies are alleviated, but not eliminated, by silicon—based measurement devices, these devices also suffer from drawbacks such as limited temperature range. Thus, a device and method are needed that overcome these and other drawbacks in the present technology. In particular, but not by way of limitation, a system and method are need that efficiently, effectively and accurately measure temperature and other environmental conditions. Such a device and method could result in significant savings in both time and money for many industries and, additionally, could result in the spread of monitoring devices to industries that once shyed away from such devices because of excessive costs.

SUMMARY OF THE INVENTION

To remedy the deficiencies of existing systems and methods, the present invention provides a method and apparatus to monitor environmental conditions.

One of the various embodiments of the present invention includes: a thermocouple configured to generate a voltage indicative of how hot a junction temperature is; a memory device configured to store a unique device ID and to store data; a logic unit connected to the thermocouple and the memory device; an I/O interface connected to the logic unit, the I/O interface configured to communicate with a computer system; and an internal temperature sensor connected to the logic unit, the internal temperature sensor configured to determine a cold junction temperature. In this embodiment, the logic unit is configured to use the voltage generated by the thermocouple and the cold junction temperature to produce a digital indication of the hot junction temperature.

Further this type of arrangement, is only illustrative of the type of sensor that can be used in this type of system. The calibration of the sensor, be it a temperature device such as a thermocouple, silicon temperature sensor or the like, or a humidity device as will be discussed below or any other type of environmental sensor can be individually identified and addressed with a minimal number of connections and more importantly a calibration adjustment can be tied to each device. This tied calibration can be as complex as needed, using multiple coefficient polynomials or a simple adjustment using an offset or almost anywhere in between. The ability of any sensor to be tied to an address or to have a unique identity allows the reading device depending on the level of accuracy needed or desired to tie a calibration to a given sensor. Further, the unique ID address can be used as a URL extension or part of a URL address to download calibration data from or over, for example the Internet or an Intranet.

BRIEF DESCRIPTION OF THE DRAWINGS

Various objects and advantages and a more complete understanding of the present invention is apparent and more readily appreciated by reference to the following Detailed Description and to the appended claims when taken in conjunction with the accompanying Drawings wherein:

DETAILED DESCRIPTION

Figure 1:
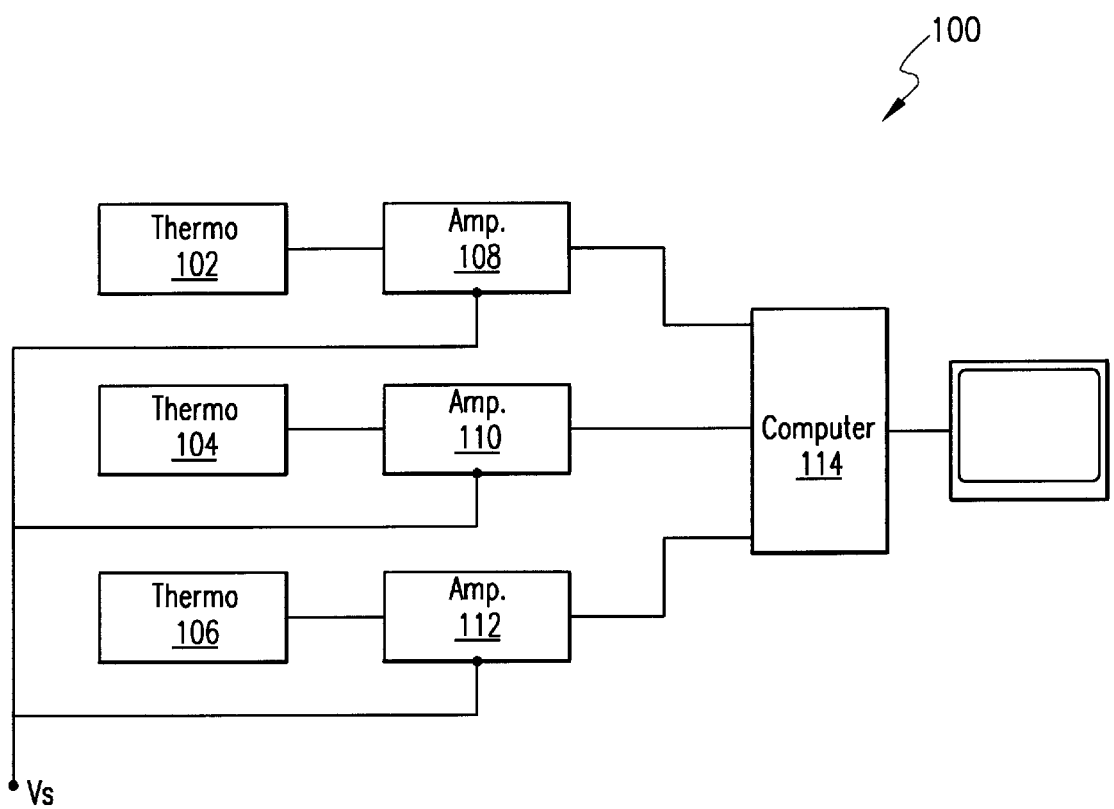
FIG. 1 is a block diagram of a temperature monitoring system.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalences and alternative constructions that fall within the spirit and scope of the invention as expressed in the claims.

Figure 2:
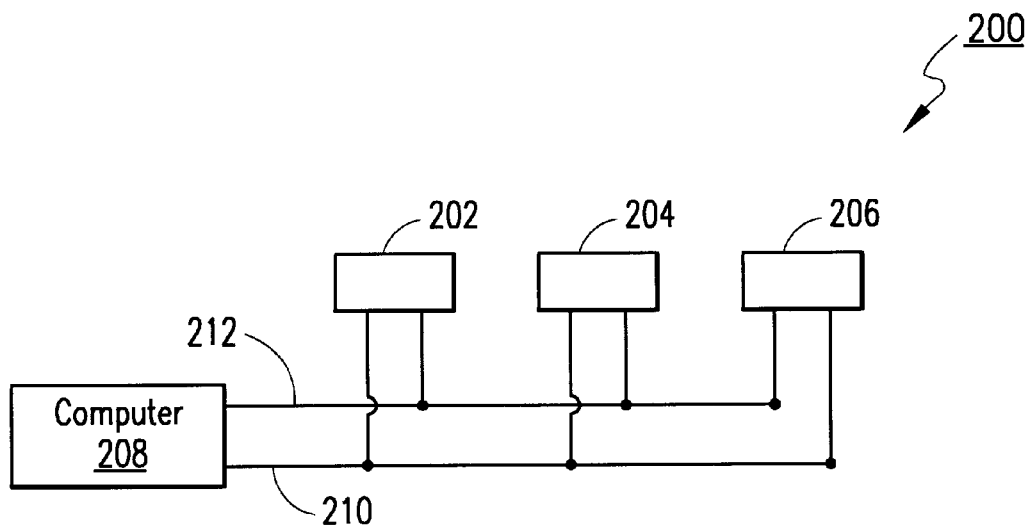
FIG. 2 is a block diagram of one embodiment of the present invention.

Referring now to FIG. 2, there is illustrated a block diagram of one embodiment of the present invention. In this embodiment, three environmental monitoring devices 202, 204, 206 (EMDs) (although more or less can be used) are connected to a computer 208 by way of two lines 210, 212. In this embodiment, line 210 is a digital data line and line 212 is a reference line. (In other embodiments, however, different connection schemes could be employed such as RF, fiber optic or other media jumpers.)

Each of the EMDs 202, 204, 206 are individually addressable by a unique ID. Thus, the computer can selectively communicate with individual EMDS. For example, the computer can poll the various EMDs to determine which ones are present at what locations. Alternatively, the computer 208 could poll a particular EMD to determine its type. That is, different types of EMDs (e.g., temperature sensor, humidity sensor, pressure sensor, photocell sensor, solar radiance sensor, thermistor, etc.) could be connected on the same data line 210 and reference line 212, and the computer 208 could poll a particular EMD to determine its type. Additionally, because each EMD 202, 204, 206 is individually addressable, virtually any number of EMDs can be connected to the computer, and they can be arbitrarily placed along the data line 210 and the reference line 212. (A more detailed description of one method of managing communication between the computer 208 and the EMDs 202, 204, 206 can be found in commonly owned and assigned U.S. Pat. No. 5,210,846, entitled One-Wire Bus Architecture, which is incorporated herein by reference.)

Figure 3:
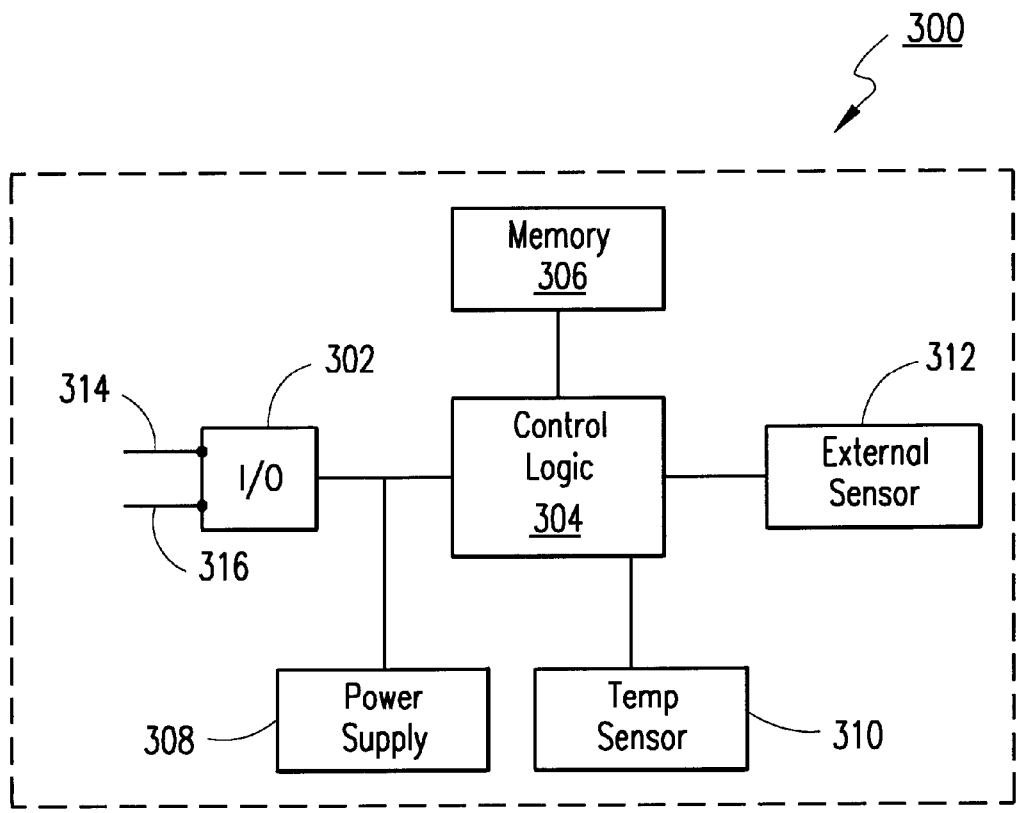
FIG. 3 is a block diagram of the environmental monitoring device (EMD) shown in FIG. 2.

Referring now to FIG. 3, there is illustrated a block diagram of one embodiment of an EMD 300 which can be of a type of EMD such as is shown as 202, 204 or 206 in FIG. 2. In this embodiment, the EMD 300 includes an I/O interface 302, a control logic 304, a memory 306, a power supply 308, an internal temperature sensor 310, and an external temperature sensor 312. Although these pieces could be located in a single piece of silicon, good results are expected by having the external sensor 312 remotely located from the other components. (Other pieces can also be located separate from each other.) Thus, the configuration and connection of the elements shown in FIG. 3 may need to be adapted to accommodate these different placements of the external sensor and/or other components.

Referring now to the I/O interface 302 of the EMD 300, it includes two input lines: the data line 314 and the reference line 316, which can correspond to data line 210 and reference line 212, respectively shown in FIG. 2. In addition to communicating with the computer over lines 314 and 316, the I/O interface 302 can be configured to "steal" power from the data line 314 and store that power in a power supply of the EMD 300, which could be, for example, a capacitor. The components of the EMD 300 can then be driven using the stored power. By "stealing" power from the data line 314, the EMD 300 can be operated without an independent power source. (One embodiment of this parasitic operation is described in more detail in commonly owned and assigned U.S. Pat. No. 5,862,354, entitled One-Wire UART for a Processor System, which is incorporated herein by reference.) Although the I/O interface 302 is described with relation to a two input, parasitic system, one skilled in the art will recognize that other interfaces and power supply systems can be used without changing the basic principles of the invention.

Still referring to FIG. 3, this embodiment of the EMD 300 includes a control logic 304 that is coupled to the memory 306, the internal temperature sensor 310 and the external sensor 312. The control logic 304 is configured to receive voltage levels from the external sensor and calculate the appropriate environmental condition therefrom. For example, when the external sensor 312 includes a thermocouple, the control logic 304 receives the voltage generated at the hot junction (not shown). This voltage is then adjusted according to the temperature at a cold junction (not shown) as determined by the internal temperature sensor 310. The control logic 304 can then use the adjusted voltage level to compute the actual temperature at the external sensor 312. (Alternatively, the adjusted voltage level could be digitally transmitted to a remote processor for conversion to an actual temperature.) This temperature reading (or voltage level) can be time-stamped and stored in the memory 306 where it can be accessed by the computer 208 (shown in FIG. 2). Additionally, the memory 306 can be configured to store a unique device ID that can be accessed by the computer 208. The memory 306 can also be used to store Seebeck constants, thermocouple type and calibration data.

Figure 4:
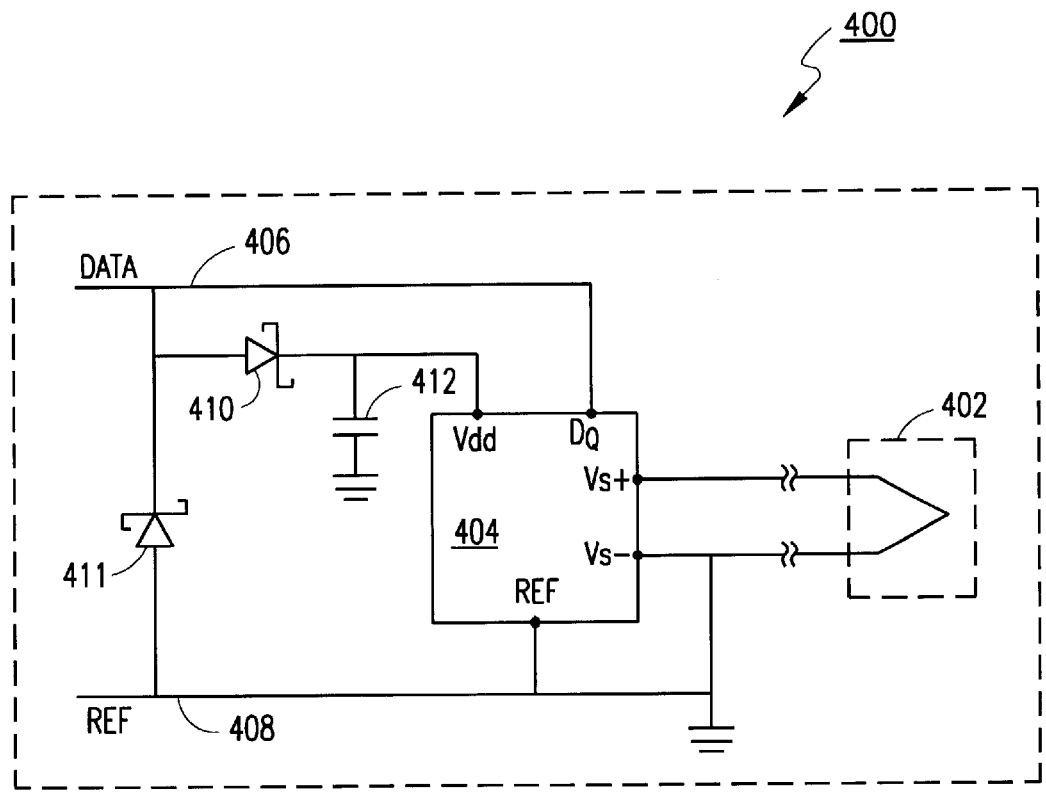
FIG. 4 is a circuit diagram of a temperature monitoring version of the EMD shown in FIG. 3.

Referring now to FIG. 4, there is illustrated a circuit diagram of a temperature monitoring version 400 of the EMD 300 shown in FIG. 3. This embodiment includes a thermocouple 402 connected to voltage sensing inputs Vs+ and Vs− of a microcontroller 404. This microcontroller could be, for example, a DS2438 Smart Battery Monitor designed and sold by Dallas Semiconductor.

The microcontroller 404 is also connected to the data line 406 (which corresponds to data line 314 of FIG. 3) at input DQ and through a diode 410 to input Vdd. As described previously, the microcontroller 404 can "steal" operating power from the data line 406 by using the diode 410 and the capacitor 412. Thus, the data line is coupled to Vdd pin through the diode 410 and in which a charge is stored in the capacitor 412 so as to provide a means to power the microcontroller 404. The microcontroller 404 is also connected to the reference line 408 (which corresponds to reference line 316 of FIG. 3) at the REF pin.

Although the temperature monitoring version of the EMD 400 can be implemented in a variety of ways, good results are expected with the configuration shown in FIG. 4. One skilled in the art, however, can recognize that in addition to other modifications, the Schottky diodes 410 and the capacitor 412, for example, can be replaced, supplemented, or otherwise modified without changing the basic operation of the circuit.

Figure 5:
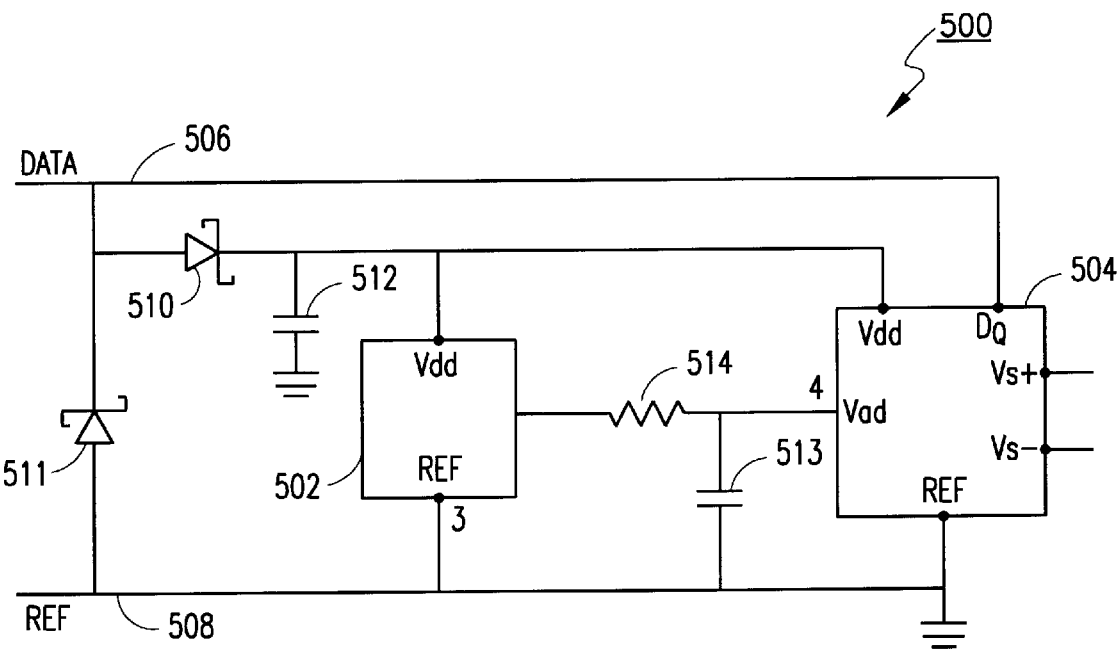
FIG. 5 is a circuit diagram of a humidity monitoring version of the EMD shown in FIG. 3.

Referring now to FIG. 5, there is illustrated a circuit diagram of a humidity monitoring version 500 of the EMD 300 shown in FIG. 3. In this embodiment, a humidity sensor 502 which for example could be a Honeywell HIH-3610 is connected through a resistor 514 to a voltage sensing input Vad of a microcontroller 504, which can be a DS2438 Smart Battery Monitor manufactured by Dallas Semiconductor or any other type of appropriate microcontroller. Additionally, the humidity sensor's Vdd pin is connected to the data line 506 through a diode 510 (which allows the humidity sensor to "steal" power from the capacitor 512 in the same manner as discussed above with respect to the diode 410 and the capacitor 412), and the REF pin is connected to the reference line 508.

As with the temperature sensing version of the EMD 400 shown in FIG. 4, the humidity monitoring version 500 has the data line 506 connected to the microcontroller's Vdd pin using the power stealing arrangement of diode 510 and capacitor 512. This implementation of the EMD 500 can also include Schottky diodes 510 and 511, capacitors 512 and 513 and a resistor 514. Although proper and efficient operation of the circuit as shown is expected, these components can be replaced and/or supplemented without changing the general operation of the circuit.

Figure 6:
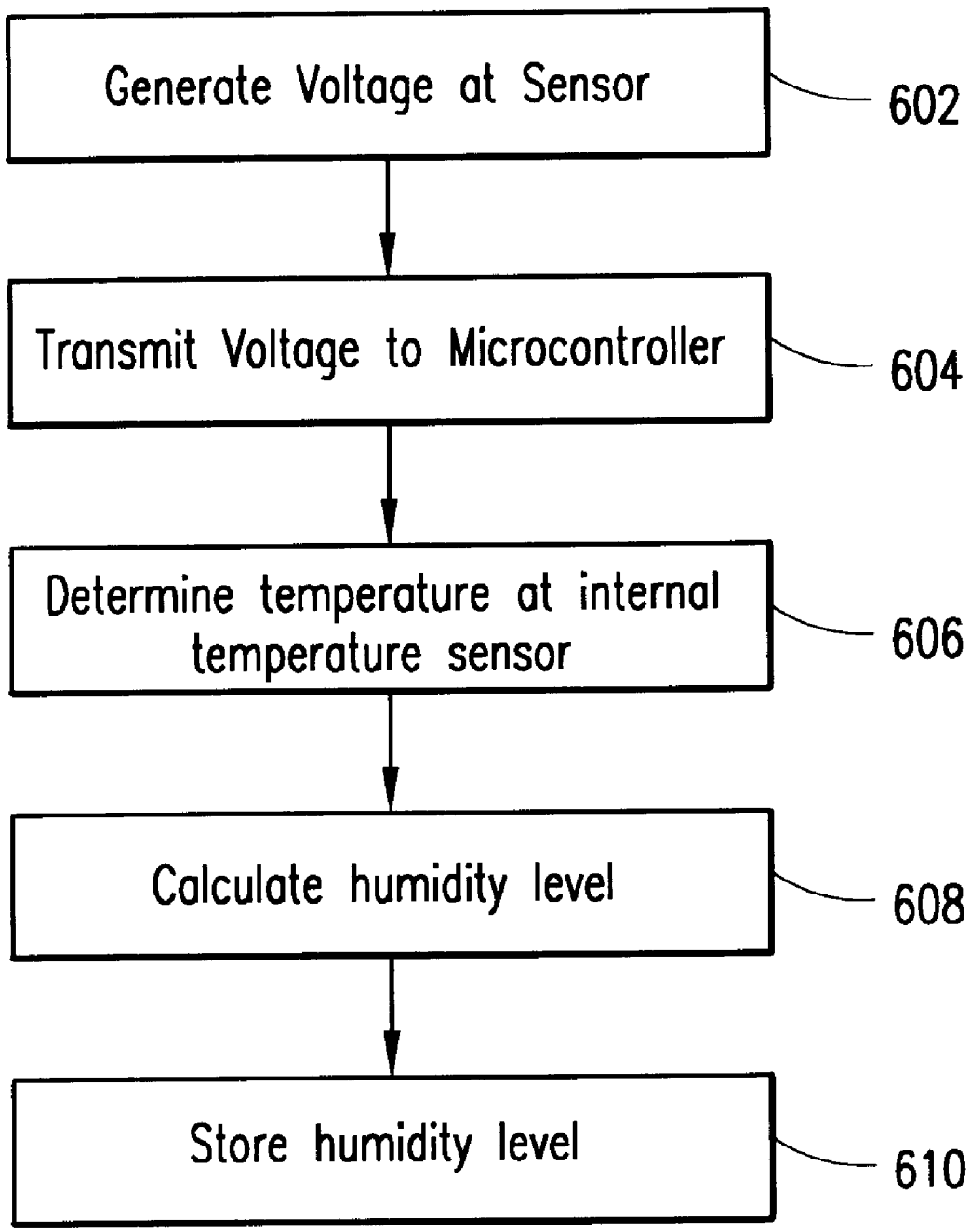
FIG. 6 is a flowchart of the operation of the circuit shown in FIG. 5.

FIG. 6 is a flowchart of the operation of the circuit shown in FIG. 5. Initially, the humidity sensor 502 generates a voltage responsive to detecting a particular humidity level (step 602). This voltage is generally in the volt range rather than the millivolt range output by a thermocouple. Thus, the generated voltage can be feed into a Vad input, rather than the Vs+ and the Vs− inputs, of the microcontroller 504 (step 604). Next, the microcontroller 504 obtains a temperature reading taken from the internal temperature sensor 310 (step 606) (shown in FIG. 3) and uses that reading along with the received voltage to determine the proper humidity level. (Alternatively, the data could be transmitted to a remote processing unit for conversion to a humidity level.) This humidity level (or data related thereto) can be time-stamped (although not necessary) and stored locally and/or communicated back to the computer 208 (shown in FIG. 2) over the data line 506 (step 610).

In conclusion, those skilled in the art can recognize that the present invention provides an efficient, effective and accurate device and method for measuring environmental conditions. Additionally, those skilled in the art can readily recognize that numerous variations and substitutions may be made in the invention, its use and its configuration to achieve substantially the same results as achieved by the embodiments described herein. As an example although specific part numbers have been identified, equivalent circuits can be used as substitutes for the specifically identified circuits. Accordingly, there is no intention to limit the invention to the disclosed exemplary forms. Many variations, modifications and alternative constructions fall within the scope and spirit of the disclosed invention as expressed in the claims.

What is claimed is:

1. A device for measuring temperature, the device comprising:

a thermocouple configured to generate a voltage indicative of a junction temperature;

a memory device configured to store a unique device ID and to store data;

a logic unit connected to the thermocouple and the memory device;

an I/O interface connected to the logic unit, the I/O interface configured to communicate with a computer system; and an internal temperature sensor connected to the logic unit, the internal temperature sensor configured to determine a cold junction temperature;

wherein the logic unit is configured to use the voltage generated by the thermocouple and the cold junction temperature to produce a digital indication of the hot junction temperature and further wherein each device for measuring temperature has stored within said memory device an electrically readable device ID which is unique to each measuring device.

2. The device of claim 1, wherein the I/O interface comprises:

a data input for receiving digital data over a data line; and a reference input connectable to a reference line.

3. The device of claim 2, wherein the I/O interface further comprises:

a power input pin, wherein the power input pin is configured to receive power from the data line, thereby parasitically drawing power from the data line.

4. The device of claim 3, further comprising:

a power storage device, wherein the power storage device is configured to store power received from a communication line connected to the I/O interface and to provide said stored power to said power input pin.

5. The device of claim 1, wherein the I/O interface and the logic unit are integrated into a single piece of silicon.

6. The device of claim 1, further comprising:

a voltage input pin connected with the logic unit;

wherein the thermocouple is connectable directly to the voltage input pin.

7. The device of claim 6, wherein the voltage input pin and the I/O interface are integrated into a single piece of silicon.

8. A device for measuring temperature, the device comprising:

a thermocouple configured to generate a voltage indicative of a temperature;

a memory device configured to store a unique device ID and to store a temperature value; and a logic unit connected to the thermocouple and the memory device, the logic unit configured to receive at least an indication of the voltage generated by the thermocouple and to determine the temperature value that corresponds to the received voltage and further wherein each device for measuring has stored within said memory device an electrically readable device ID which is unique to each measuring device.

9. The device of claim 8, further comprising:

an internal temperature sensor connected to the logic unit, the internal temperature sensor configured to determine a cold junction temperature;

wherein the logic unit is further configured to compensate for the cold junction temperature in determining the temperature value that corresponds to the received voltage.

10. The device of claim 8, further comprising:

an I/O interface connected to the logic unit, the I/O interface configured to digitally communicate with a computer system.

11. The device of claim 10, wherein the I/O interface comprises:

a single data input for receiving data over a data line, from the computer system; and a reference input connectable to a reference line.

12. The device of claim 11, wherein the I/O interface further comprises:

a power input pin, wherein the power input pin is configured to receive power from the data line.

13. The device of claim 12, further comprising:

a power storage device, wherein the power storage device is configured to receive and store power from a communication line connected to the I/O device and to provide said stored power to said power input pin.

* * * * *